April 6, 1965            I. J. DAVIS            3,177,496

PHOTOGRAPHIC REPRODUCTION METHOD

Filed July 2, 1962            2 Sheets-Sheet 1

INVENTOR.

Irwin J. Davis

April 6, 1965  I. J. DAVIS  3,177,496
PHOTOGRAPHIC REPRODUCTION METHOD
Filed July 2, 1962  2 Sheets-Sheet 2

INVENTOR.
Irving J. Davis

United States Patent Office 3,177,496
Patented Apr. 6, 1965

3,177,496
PHOTOGRAPHIC REPRODUCTION METHOD
Irwin J. Davis, New Haven, Conn.
(620 Pemberton Ave., Plainfield, N.J.)
Filed July 2, 1962, Ser. No. 206,660
2 Claims. (Cl. 352—86)

THREE DIMENSIONAL PHOTOGRAPHIC TRANSPARENCIES

This invention relates to a method for producing three dimensional photographic transparencies by a process of segmented illumination of a subject, whereby each segment is photographed separately and reproduced on a transparent medium, extended in space as to duplicate the original subject in regard to spatial arrangement.

Considerable effort has gone into the devolpment of three dimensional graphic effects for displays of improved realism over the conventional two dimensional types. A common device has been the stereo method whereby a three dimensional effect is achieved by producing for each eye of the observer a separate image simulating the separate images received in the eyes in binocular vision. The stereo effect requires the observer to wear glasses in order to insure a separate image for each eye, which imposes serious limitations on this method.

Another method of producing three dimensional effects is the parallel plates method, whereby an image is extended in space by being transferred to a series of transparent plates with gaps between them to duplicate the spatial arrangement of reality. This method has been used to the best of my knowledge for images created by drawings and paintings and not for images created by photography. My invention deals with a technique whereby the photographic process with its high state of technological development may be adapted to the parallel plate method of producing three dimensional effects. My invention also deals with an improvement in the parallel plate technique whereby the gaps between the plates bearing the image are filled by a rigid transparent plastic which further enhances realism by eliminating the multiple reflective surfaces of each individual plate as is the case when the gap is filled with air. The rigid transparent plate separators also prevent the accumulation of dust between the plates and can act as support for a flexible transparent material carrying the image in place of the usual rigid plates.

Figure 1:
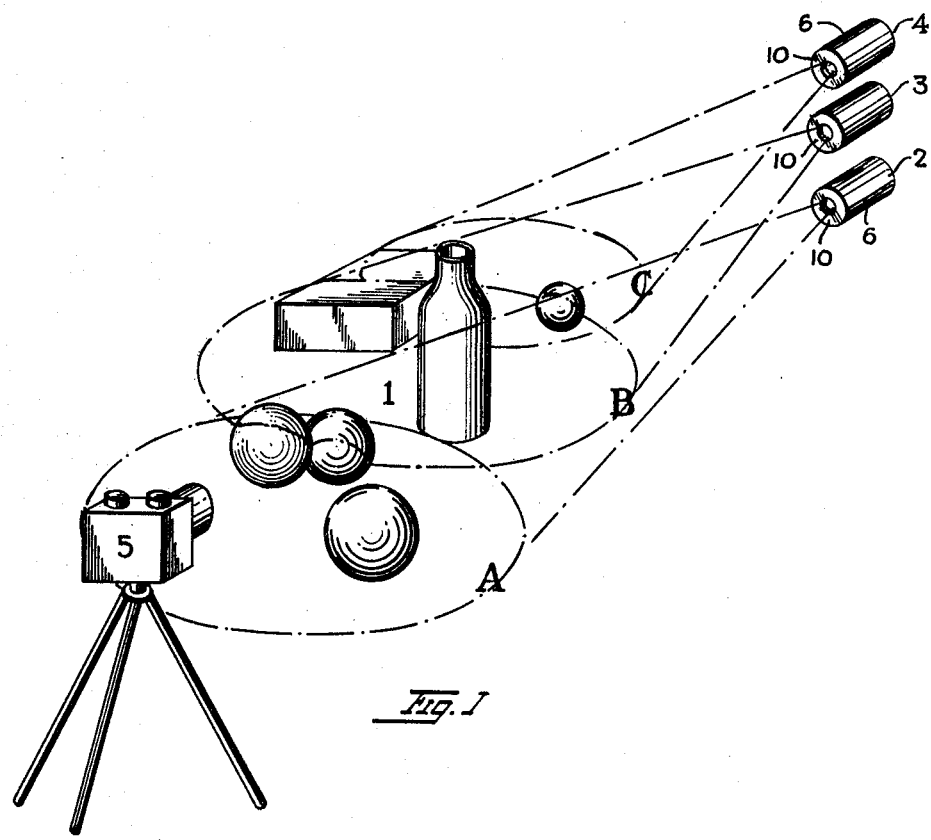
Figure 2:
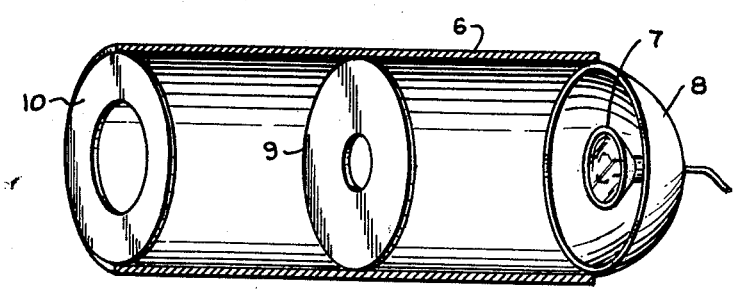
Figure 3:
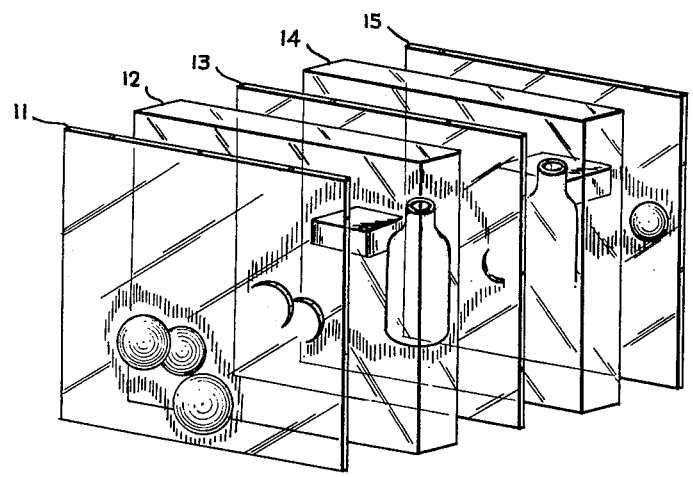
Figure 4:
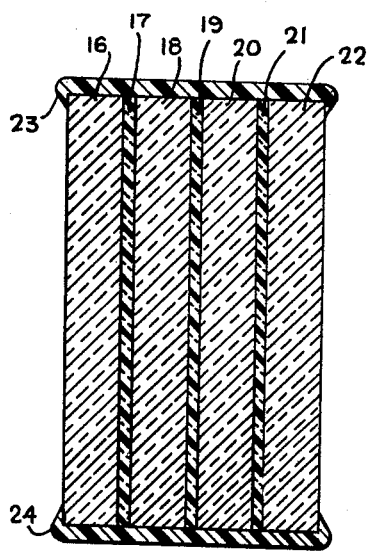

Exemplary embodiments will now be described in connection with the accompanying drawings in which;

FIGURE 1 is an illustration of a subject being photographed in the novel method herein described, FIGURE 2 is a detailed drawing of an illuminator or a device for producing a sharply defined area of illumination, FIGURE 3 represents the method of assembling positive prints on glass obtained by segmented illumination to give the final three dimensional transparency, FIGURE 4 is a cross section of the final assembly of positive prints reproduced on a transparent flexible plastic and supported by clear rigid plastic.

In FIGURE 1 a subject 1 composed of simple forms is photographed by a camera 5 in the following manner. An illuminator, which is a device for producing a sharply defined area of illumination, designated 2, is turned on which consequently illuminates area A and only area A, which is photographed by camera 5 on a photographic sensitized film or plate. After area A has been photographed, illuminator 2 is turned off, and illuminator 3 is turned on illuminating area B, whereby camera 5 photographs area B on a distinct and separate photographic sensitized film or phate. After photographing area B, illuminator 3 is turned off and illuminator 4 is turned on illuminating area C which in turn is photographed on a distinct and separate sensitized film or plate. It should be noted that areas A, B, and C, all overlap to a considerable degree, and this overlapping is necessary to the production of the three dimensional effect. The procedure previously described is in effect the scanning of a subject in regard to depth by a beam of light, which is recorded on a series of photographs. The exposure settings of the photographic sensitized film or plate are so regulated that only the area illuminated by the illuminator that is operating is recorded, all other areas remaining unexposed on the negative. An alternate method substantially slower but just as effective would be to use one illuminator instead of a multitude of illuminators, and adjust its position after each exposure so that areas A, B, and C, in FIGURE 1 are substantially the same.

FIGURE 2 is a representative illuminator whereby a light source 7, is enclosed in a tube 6, with a reflector 8, behind the light source. Apertures 9 and 10 are arranged midway and at the end of the tube and act to restrict the light into a sharply defined beam. For some subjects, a rectangular beam may be more appropriate so that apertures 9 and 10 would be rectangular rather than circular. It is also possible to place a concave lens in aperture 10 to concentrate the beam of light. The illuminator may be of any design and have any light source as long as it produces) a sharply defined area of illumination that can be recorded by a photographic film.

After a subject is photographed in the manner described, the exposed film is developed and a negative is produced. From each negative a positive image is produced on a transparent medium as glass or clear positive film. A projection method of producing a positive is preferable as the unexposed portions of the negative, outside the illuminated area, can be masked during the projection of the positive in producing the print, to give the print maximum clarity for the composite picture. In FIGURE 3, positive prints on glass 11, 13, and 15, corresponding to illuminated areas A, B, and C, in FIGURE 1, are assembled with a clear plastic spacer 12 and 14 arranged between plates 11 and 13, and 13 and 15 respectively, in order to extend the image in space and achieve an illusion of depth. The use of a rigid transparent plastic sheet of a substantial thickness as a spacer has several advantages over a separation of the plates by other means in that it eliminates a multitude of reflective planes and so contributes to the continuity of the total image as it extends through space. The overlap of the individual images lead the eye through the composite image in which all individual images are placed in register with transparent spacers beween them. The individual components of transparent prints and spacers properly juxtaposed in the order they appear, can be clamped together by mechanical means on the edges or cemented with a suitable adhesive, also on the edge so as not to interfere with the composite image.

FIGURE 4 represents a cross section view of a three dimensional photographic transparency, made in the manner previously described, whereby a flexible transparent film serves as the medium upon which the positive image is printed. The flexible transparent film 17, and 19, and 21, are separated by rigid transparent spacers 18, and 20. Additional transparent rigid plastic sheets 16 and 22, are used in front and back for support. The complete composite is secured in metal mounting 23 and 24.

Example 1

In a room under normal daylight illumination, a subject, consisting of a doll or mannekin approximately 36 inches tall, seated in a chair, was photographed in the following manner. A fixed 35 mm. camera, having a f:3.5 lens and containing a flash sychronized shutter, was located 54 inches from the subject at a height of 36 inches. Three illuminators were used, located at the right of the camera, at a 45° angle to the camera and 35 inches from the subject at a height of 60 inches. The illuminators were of the same design as illustrated in FIGURE 2, approximately 10 inches long and having a #5 flashbulb as the source of illumination. The three illuminators were wired in such a manner that only one illuminator could fire at a time, and each were synchronized to the camera shutter. The photographer was required to switch on each illuminator as required and in the necessary sequence, as he photographed the subject.

The first illuminator was arranged to light a sharply defined circular area covering the feet, legs and thighs of the mannekin. The second illuminator covered the thighs to the neck, while the third covered the shoulders and head. The exposure settings for the camera were f:11 at 1/25 of a second, using Eastman Kodak Co. of Rochester N.Y. high speed panchromatic film, designated Tri-X. This exposure was found to record only that area inside the field of the illuminator.

The first illuminator was fired and the film exposed simultaneously. The film was then advanced and the second illuminator was fired and the film exposed. The film was advanced again and the third illuminator was fired and the film exposed. The photographing of the subject required seven seconds.

The film was developed and printed on 4" x 5" fine grain positive film by projection printing using an enlarger. During the projection exposure, the unexposed areas of the negative, outside the illuminator's field, were masked to render them unexposed on the positive. After the positive prints were processed, they were arranged as illustrated in FIGURE 4 with 1/4" x 4" x 5" clear acrylic plastic spacers between the prints and in the front and rear. The order of the prints were such as to correspond to the subject.

*Example 2*

In a dark room, using the same subject as in Example 1, namely a seated mannekin, the following procedure was used. The fixed camera of the same type as used in Example 1, was located 54 inches from the subject and at a height of 36 inches. A single illuminator of the type illustrated in FIGURE 2 with a number one photoflood incandescent lamp as the light source was located to the front right of the camera, at a 45° angle to the camera and 36 inches from the camera. An exposure of f:3.5 at 1/10 of a second was found to be the exposure that recorded the illuminated area on the Eastman Kodak Tri-X high speed panchromatic film used. The illuminator was turned on and the portion of the subject comprising the feet, legs and thighs was illuminated. The film was exposed and the position of the illuminator was changed to cover the area comprising the thighs, midsection and neck of the subject. The film was advanced to the next frame and exposed again. The position of the illuminator was again changed to cover the shoulders, neck and head of the mannekin and the film advanced and exposed. The procedure required 30 seconds.

The film was developed and projection printed on 2" x 2" glass lantern slides, with the unexposed areas of the negative masked, during the projection printing. The glass slides were processed and arranged in the manner illustrated in FIGURE 3, with 2" x 2" x 1/8" clear rigid acrylic plastic as spacers between the glass plates. The entire composite was cemented together with an epoxy type adhesive along the outer edge.

*Example 3*

The negatives produced in Example 1 were used to produce engraved plates for printing by the photoengraving process. These plates were used for printing with ink on clear flexible cellulose acetate film of 0.005 inch thickness, manufactured by the Eastman Kodak Co. and designated Kodapak 1. The photoengraved plates produced were such as to render 5" x 7" prints corresponding to the positive prints produced by photographic means in Example 1. The positive images printed on the cellulose acetate film are assembled as illustrated in FIGURE 4 with 1/2" x 5" x 7" clear acrylic plastic as spacers and means of support.

The photographing of the subject can be so automated with motor driven film advance and automatic switching sequence for the illuminators by known skills in the art, as to photograph a subject in the novel manner herein described in less than a second. The use of the photoengraved plates to print on clear flexible film can be employed for mass producing low cost three dimensional displays.

I claim:

1. A method of producing a photographic reproduction of a subject whereby said reproduction provides the viewer with an overall three dimensional image of the subject, said method comprising the following steps: (1) illuminating at least two adjacent segments of the subject, each of said illuminated adjacent segments substantially overlapping one another with each of said overlapping adjacent segments being selectively illuminated by means of a sharply defined field of illumination; (2) individually recording each of said selectively illuminated adjacent segments of the subject by photographic means upon an individual photographically sensitized medium, the exposure of each of said photographically sensitized media being adjusted so as to record only that segment of the subject within its respective selective field of illumination; (3) photographically developing each of the exposed photographic media so as to produce a separate negative image of each of the selectively illuminated adjacent segments of the subject; (4) illuminating and projecting each of said negative images of the respective adjacent segments of said subject upon a photographically sensitized, transparent, flexible plastic sheet in which prior to illuminating and projecting each of said negative images, the unexposed portions of each of said negative images, outside of its original selective field of illumination is masked with an opaque medium so as to provide the resulting positive image with maximum clarity; (5) photographically developing each of the exposed, photographically sensitized, transparent, flexible plastic sheets so as to produce a positive image of each of the overlapping adjacent segments of said subject; (6) the resulting transparent, flexible plastic sheets, each of which has a positive image of a segment of said subject thereon, then being so arranged that the positive images are behind and parallel to one another so that the respective positive images, whose subject matter is substantially overlapping with respect to the adjacent subject matter of the positive image on either side thereof, are in an order which corresponds to their actual position in reality; (7) placing spacers, comprising rigid, transparent plastic sheets having a thickness substantially greater than the thickness of the positive images, in front and behind each of said positive images and in a position parallel to said positive images so that the surfaces of said positive images are in complete and intimate contact with the surfaces of said spacers thereby providing support for said positive images while simultaneously eliminating any air gaps and the resultant internal reflectance between said positive images and thus enhancing the overall illusion of depth; (8) means also being provided to securely maintain the respective components of the resulting assembly in their proper position with respect to one another.

2. The method of claim 1, wherein said positive images are used to prepare permanent printing plates, each of which are identical in content with the positive image from which it was prepared, said permanent printing plates then being used to print additional positive images upon transparent, flexible plastic sheets.

References Cited by the Examiner

UNITED STATES PATENTS 2,522,662  9/50  Brier _____ 352—52

FOREIGN PATENTS 1,087,040  8/54  France.
397,547    8/33  Great Britain.

NORTON ANSHER, *Primary Examiner.*
JOHN M. HORAN, *Examiner.*